Figure 1:
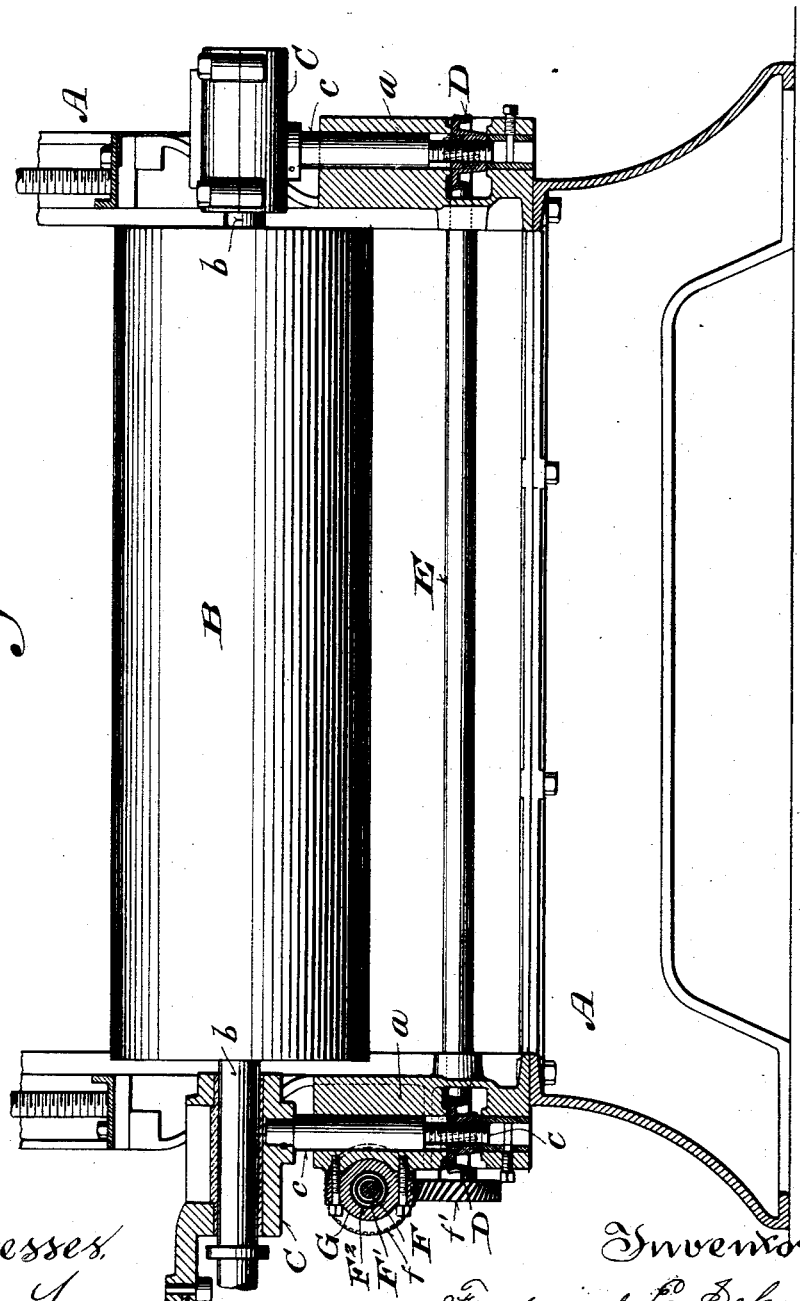

(No Model.)　　　　　　　　　　　　　　　　　2 Sheets—Sheet 1.
F. E. SCHMITT.
CYLINDER ADJUSTING MECHANISM FOR POLISHING MACHINES.
No. 525,472.　　　　　　　　　　　Patented Sept. 4, 1894.

Witnesses　　　　　　　　　　　　　　Inventor:
Geo. W. Young.　　　　　　　　　Frederick E. Schmitt,
Chas. L. Cox.　　　　　　　　　　By Winder Ronders Smith Patten Vilas
　　　　　　　　　　　　　　　　　　　　　Attorneys

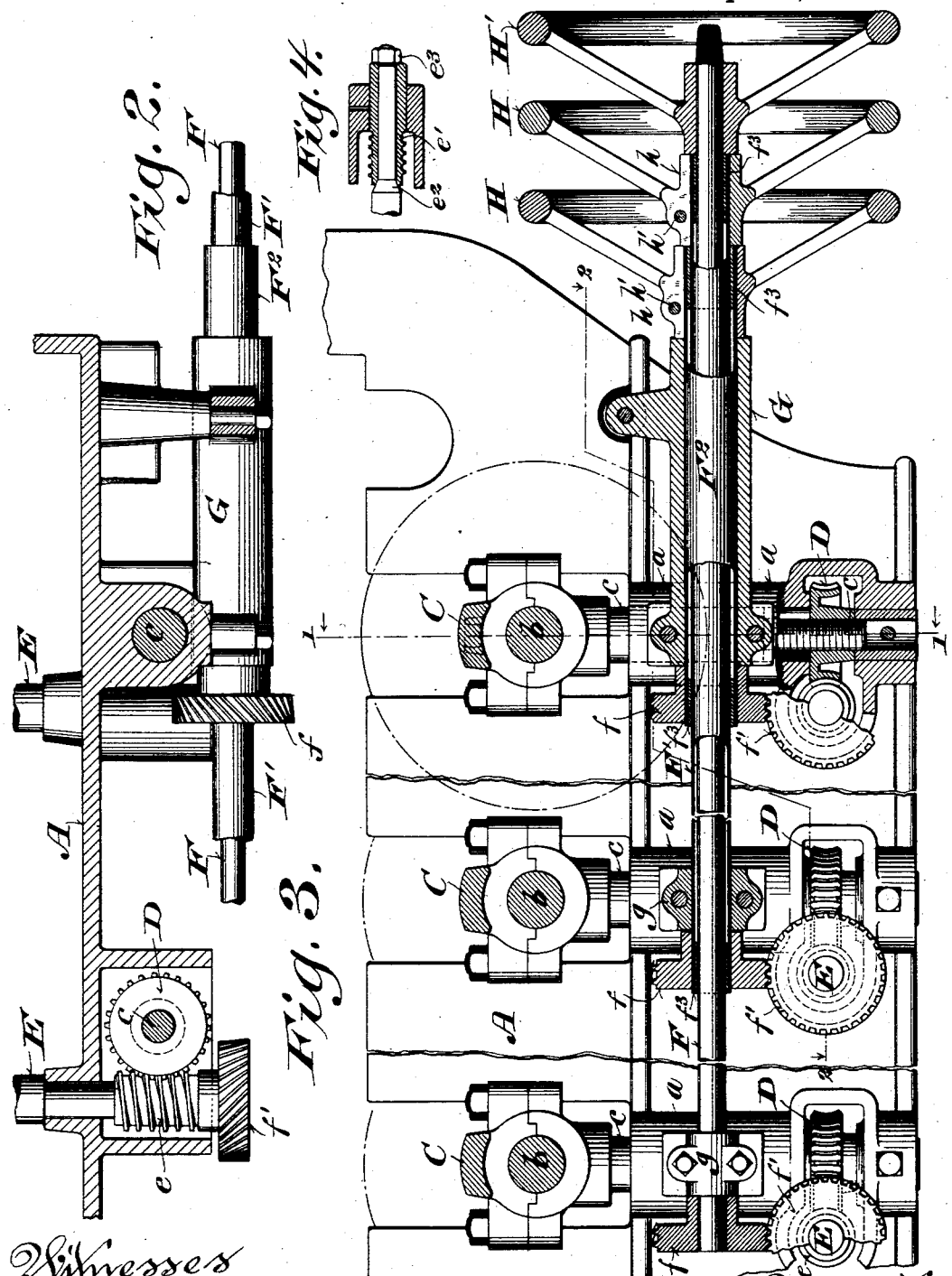

UNITED STATES PATENT OFFICE.

FREDERICK E. SCHMITT, OF MILWAUKEE, WISCONSIN, ASSIGNOR TO THE MILWAUKEE SANDER MANUFACTURING COMPANY, OF SAME PLACE.

CYLINDER-ADJUSTING MECHANISM FOR POLISHING-MACHINES.

SPECIFICATION forming part of Letters Patent No. 525,472, dated September 4, 1894.

Application filed April 24, 1894. Serial No. 508,801. (No model.)

*To all whom it may concern:*

Be it known that I, FREDERICK E. SCHMITT, of Milwaukee, in the county of Milwaukee and State of Wisconsin, have invented certain new and useful Improvements in Cylinder-Adjusting Mechanism for Polishing-Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to facilitate the adjustment of the polishing cylinders and generally to improve the construction and appearance of machines of this class.

It consists essentially of a number of rotary adjusting shafts placed concentrically one within another and each connected at one end with the supporting bearings or boxes of one of the polishing cylinders by suitable mechanism and provided at the other end within easy reach of the operator with hand wheels or other suitable means for turning it.

In the accompanying drawings like letters designate the several parts in the several figures.

Figure 1, is a vertical cross-section on the line 1, 1, Fig. 3, of a portion of a polishing machine to which my improvements are applied. Fig. 2 is a horizontal section on an enlarged scale on the line 2, 2, Fig. 3. Fig. 3 is a partial side elevation and vertical longitudinal section of the cylinder adjusting mechanism; and Fig. 4 is a sectional detail of one of the worms constituting a part of the cylinder adjusting mechanism.

Referring to Fig. 1, A designates the frame of the machine, B one of the polishing cylinders, $b\ b$ the shaft or journals of the cylinder and C C, the boxes or bearings in which said shaft or journals are adapted to turn, and by which the cylinder is supported at each end. These boxes are provided on the under side with vertical stems $c\ c$ which are held and guided in sleeves $a\ a$ on the sides of the frame. The lower ends of the stems are reduced and screw threaded.

D D are worm gears formed with nuts or internally threaded hubs which are inserted and bear at the ends in horizontal recesses in the sleeves $a\ a$ and engage the threaded portions of the stems $c\ c$.

E is a horizontal shaft parallel with the axis of the cylinder and provided at the ends with worms $e$ and $e'$ which engage with the adjacent worm gears D D as shown in Figs. 2, 3 and 4. The worm $e'$ at one end of said shaft E is arranged to be readily connected or disconnected therewith, so as to be turned or not with said shaft by means of conical friction surfaces $e^2$, and a nut $e^3$ for producing engagement thereof.

The construction and arrangement of the parts of the machine hereinbefore mentioned are such as have been employed heretofore in machines of this class and I make no claim thereto *per se*.

My improvements are applicable to polishing machines which have a number of polishing or abrading cylinders arranged as indicated in Fig. 3, and to enable the operator to adjust the several cylinders vertically without changing his position I provide the shafts F, F' and F², one for each polishing cylinder, arranged concentric with each other lengthwise of the machine and connected with the worm wheel shafts E by spiral or screw gears $f f'$. These shafts are placed one within another, the outer shafts being tubular and shorter than the inner shafts. The outside tubular shaft F² is supported and capable of turning in a sleeve G which is formed with or attached to the frame, and each of the inner shafts F and F' is supported and turns in bushings $f^3 f^3$ inserted in the ends of the next outer tubular shaft, and at its projecting end adjacent to the screw gear $f$ thereon, in a box $g$ formed with or attached to the frame. At the ends opposite the gears $f f$ said shafts are provided with hand wheels H H' or cranks.

The hand wheels H H are formed with split hubs $h\ h$ which are clamped by bolts or screws $h'\ h'$ upon the front ends of the tubular shafts and the hand wheel H' is keyed or otherwise secured upon the front end of the inner and longer shaft F which is preferably made of a solid bar. Endwise displacement of said shafts is prevented by the hubs of the hand wheels bearing against each other and the front end of the sleeve G and by the hubs of the gears $ff$ bearing against the other end of sleeve G and the boxes $g\ g$. This arrangement of the adjusting mechanism not only enables the operator to readily raise or lower any or all of the several polishing cylinders without leaving his place at the front of the machine, but is also simple, compact and sightly in appearance. By turning either one of the hand wheels H H' the polishing cylinder with which it is connected is raised or lowered simultaneously at both ends alike through the mechanism hereinbefore described.

When it is desired to level a cylinder or to adjust either end without changing the position of the other, the nut $e^3$ on the associated worm shaft is loosened, thereby releasing the worm $e'$ from engagement with said shaft. The hand wheel connected with said cylinder may now be turned so as to raise or lower the box or bearing C at the opposite end of the cylinder without effect upon the box or bearing with which the worm $e'$ is connected.

I claim—

1. In a polishing machine the combination with a number of polishing cylinders and a frame provided with vertically adjustable bearings therefor, of a number of concentric shafts arranged one within another and each connected by suitable mechanism with a supporting bearing of one of said cylinders, substantially as and for the purposes set forth.

2. In a polishing machine the combination with a number of polishing cylinders, a frame provided with vertically adjustable bearings therefor, and cross shafts geared with said bearings, of concentric shafts arranged one within another and connected with said cross shafts by spiral gears and provided at their front ends with hand wheels or cranks arranged close together one in front of another, substantially as and for the purposes set forth.

3. In a polishing machine the combination with a number of polishing cylinders, a frame provided with vertically adjustable bearings therefor having screw threaded stems, worm gears having threaded hubs engaging said stems and worms engaging said gears, of concentric shafts arranged one within another each inner shaft extending at both ends beyond the next outer shaft connected at one end with the worm shaft of one of the cylinders by spiral gears, and provided at the other end with a hand wheel or crank, substantially as and for the purposes set forth.

4. In a polishing machine the combination with a number of polishing cylinders, a frame provided with vertically adjustable bearings therefor having screw threaded stems, worm gears having threaded hubs engaging said stems, shafts parallel with the cylinders provided with worms engaging said gears, and means of engaging and disengaging one worm on each shaft, of concentric shafts arranged one within another and each connected by spiral gears with one of the worm shafts, substantially as and for the purposes set forth.

In testimony that I claim the foregoing as my own I affix my signature in presence of two witnesses.

FREDERICK E. SCHMITT.

Witnesses:
CHAS. L. GOSS,
M. L. EMERY.